Feb. 23, 1960 P. J. W. JOCHEMS 2,926,290
SEMI-CONDUCTOR DEVICE
Filed Dec. 9, 1954

INVENTOR
PIETER JOHANNES WILHELMUS
JOCHEMS
BY
AGENT

United States Patent Office 2,926,290
Patented Feb. 23, 1960

2,926,290
SEMI-CONDUCTOR DEVICE

Pieter Johannes Wilhelmus Jochems, Eindhoven, Netherlands, assignor, by mesne assignments, to North American Philips Company, Inc., New York, N.Y., a corporation of Delaware Application December 9, 1954, Serial No. 474,251

Claims priority, application Netherlands December 23, 1953

9 Claims. (Cl. 317—235)

This invention relates to semi-conductor devices, and in particular to such devices possessing an alloy-type electrode.

It is known to manufacture an electrode system comprising a semi-conductive body, for example a crystal diode or a transistor, by fusing one or more electrodes to this body. Transistors are known which may be made from a thin plate of germanium of the n-conductivity type, to which small quantities of indium are fused to each side. It is assumed that these fused quantities produce locally thin layers of p-type germanium. Such electrodes are termed alloy electrodes.

For the correct operation of the electrode system and for the reproducibility of the properties it is desirable to predetermine accurately the dimensions of the surface of the semi-conductive body covered by the alloy. This may be obtained by preparing globules of an accurately weighed quantity of the metal to be fused, by placing them on the semi-conductive body and by subsequently heating the assembly.

However, this method can be carried out only with difficulty, if the globules to be fused are very small, and have for example a diameter of less than ¼ mm.; in this method a current supply wire or connecting terminal must, in addition, be soldered to the electrode; this is also difficult in the case of very small globules.

The invention has for its object inter alia to obviate these disadvantages.

In accordance with the invention, at least one unhomogeneous wire, termed hereinafter electrode wire, is secured to the semi-conductive body, this wire being made from two metals having different melting points, the metal having the lower melting point being fused together with the semi-conductive material to form an alloy electrode, the diameter of which exceeds that of the electrode wire. The term "metal" is to be understood to mean herein not only the pure elements, but also alloys which may contain metalloids in addition to metals.

In this electrode system the metal having the higher melting point has mainly the function of supporting the other metal and of restricting the flowing-out of the latter over the surface of the semi-conductive body. The extent to which the metal having the lower melting point flows out depends mainly upon its surface tension and upon the adhesion with the metal having the higher melting point and the semi-conductive material. The electrode wire may for example be constituted by a thin metal tube filled with a core of other metal having a lower melting point. The metal having the lower melting point may, as an alternative, be the envelope of the core having a higher melting point. As a further alternative, a porous electrode may be made from the metal having the higher melting point, or a wire having a rough surface may be made, the pores being filled with a metal having a lower melting point. In all these cases the metal having the higher melting point supports the other metal, so that the shape of the wire as a whole remains intact when fused to the semi-conductive body.

The metal having the higher melting point may form part of the alloy formed by the metal having the lower melting point and the semi-conductive material.

It should be noted that it is known to manufacture tapering whiskers (point electrodes) from a core of a metal having a high melting point, for example tungsten, having a coating of gold or platinum, which metals melt at a lower temperature. Such wires may be welded to the semi-conductive body with the aid of a current pulse. In this case the quantity of alloy produced depends entirely on the shape of the point and the strength of the current pulse. The sectional area of the alloy electrode is much smaller than that of the point. The manufacture of such tapering whiskers is very circuitous, since first the core must be tapered and then be provided individually with a coating.

With the use of the invention the electrode wire may be manufactured at great length, it being then cut into short pieces in a simple manner. Such a short piece may lead directly to connecting members of the electrode system, but as an alternative, it may be welded, prior to or subsequent to the fusion to the semi-conductive body, to a further conductor which will generally be constituted by a normal homogeneous wire.

The electrode system according to the invention is preferably made by introducing a piece of electrode wire made from the two metals having different melting points into a gauge or jig on the semi-conductive body and by heating the assembly to a temperature between the two melting points of the metals for such a long time that an alloy electrode is produced.

In a further method the semi-conductive body is clamped on either side in a clamping member having at least two limbs, of which at least one is formed by a piece of electrode wire, and then heated to a temperature between the melting points of the metals of the electrode wire in a manner such that an alloy electrode is produced.

This method is very simple, if the clamping member is constituted by a wire turn interrupted at one area, the semi-conductive body being clamped in the void, and the wire turn being cut open, after the two ends have been fused to the body.

The invention will now be described more fully with reference to a few embodiments shown in the drawing.

Figures 1, 2, 3, 4, 5:
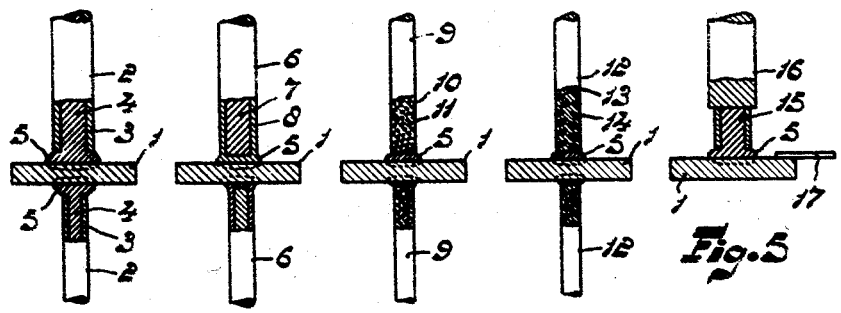
Figs. 1 to 4 show various transistors partly in a sectional view.
Fig. 5 shows a diode partly in a sectional view.

Referring to Figs. 1 to 5, reference numeral 1 designates a semi-conductive body, for example a wafer of germanium or silicon.

In the transistor shown in Fig. 1 two electrode wires 2 are fused to this wafer, these wires being constituted by a sheath 3 and a core 4. The sheath is made from the metal having the higher melting point; the fusion temperature is chosen to be such that substantially only the core melts and produces an alloy 5 with the semi-conductive material 1.

It may occur that the metals 3 and 4 do not produce an alloy with one another at the fusion temperature, the metal having the higher melting point being dissolved in the alloy 5 formed by the other metal 4 and the semi-conductive material 1. This applies not only to the embodiment shown in Fig. 1, but also to those shown in Figs. 2 to 5.

With the construction shown in Fig. 2 use is made of an electrode wire 6 made from a core 7 of a metal melting less rapidly than the sheath 8.

Fig. 3 shows a porous electrode wire 9 of a metal 10, the pores of which are filled with a metal having a lower melting point 11.

With the construction shown in Fig. 4 use is made of an electrode wire 12 made from the metal 13 having a higher melting point, its surface holes 14 being filled with a metal having a lower melting point.

The electrode wires shown in Figs. 1 and 2 may be produced readily by filling a tube of one metal with the other metal and by producing an electrode wire by means of drawing or swaging. The diameter of the final product as may be used in a transistor may be approximately 0.1 mm. As an alternative, the sheath may be applied to a core for example by electro-deposition, or, as in the case shown in Fig. 2 by immersion into molten metal.

A porous electrode wire may be obtained by etching in the manner applied for example to porous electrodes of electrolytic cells. As an alternative, by sintering pulverulent metal a porous electrode wire may be obtained. Consequently, a skeleton of a metal having the higher melting point is obtained, the pores being filled with the other metal.

A rough electrode wire as shown in Fig. 4 may be produced in a simple manner by etching.

Other methods may be used to obtain such electrode wires, these methods corresponding to one another to the extent that the composition is not homogeneous and that viewed in the direction of length the wires are uniform, so that pieces may be cut off and fused on the semi-conductive body without the need for a special working of the wire terminations.

The electrode wires may lead directly to the connecting members (not shown) of the electrode system, but in many cases it will be advantageous to connect them prior or subsequent to the fusion to the semi-conductive body to a further conductor which is more suitable for establishing a connection, for example a copper wire or a wire specially suited for sealing in glass.

This is shown diagrammatically in Fig. 5. On the semi-conductive body 1 is fused a wire constituted by two welded parts. The lower portion 15 has the same composition as the electrode wire 2 of Fig. 1, and the upper portion which constitutes the connecting wire may for example be made of copper, or, if this wire is to be sealed in glass, of so-called copper-coated wire or of ferrochromium. To the body 1 is furthermore soldered a base contact strip 17, so that a diode is obtained.

From Figs. 1 to 5 it is evident that the alloy 5 produced extends below the end of the wire having the higher melting point, so that the latter part is not in contact with the semi-conductive material. The said part terminates, in general, in a plane transverse to the longitudinal axis of the wire, so that this construction differs from the known constructions, in which a point is coated with gold or platinum; in the latter case the tungsten point maintains its tapering shape. With an electrode system according to the invention the part of the wire having the higher melting point may, of course, terminate in a slanting plane and have a more or less acute shape; this may be due to the cutting of the wire. The wire, however, has at any rate a uniform thickness immediately over the sealing area.

The fact that the part having the higher melting point is not in contact with the semi-conductive material is normally due to the surface tension of the molten alloy 5, if at least the wire is not subjected to excessive pressure during melting.

Figures 6, 7:
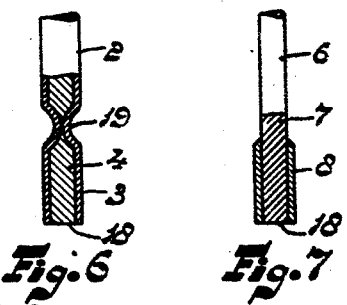
Figs. 6 and 7 show two embodiments of a piece of electrode wire.

In order to produce the alloy, the electrode wire must give off a small quantity of the metal having the lower melting point. In some cases, and this applies more particularly to the electrode wire shown in Fig. 1, there may be the risk that the quantity given off becomes too large; it is then desirable to obturate the channel in the sheath 3 prior to the melting operation at some distance over the electrode; this is shown in Fig. 6. This may be obtained in a most simple manner by cutting short pieces from a great length of electrode wire 2 by means of a device which produces the cut 18 simultaneously with an indent 19 in the wire.

With the use of an electrode wire as shown in Fig. 2 the metal 8 having the lower melting point may be removed at some distance over the cut 18, for example by etching it away (Fig. 7).

Figure 8:
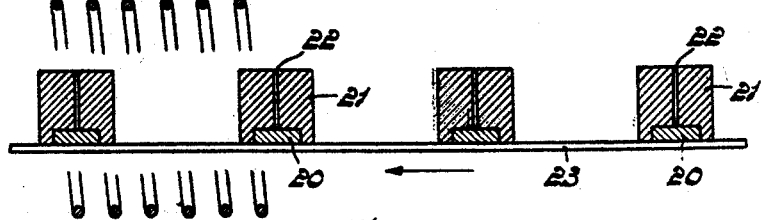
Figs. 8 and 9 show diagrammatically a device for fusing electrode wires to the semi-conductive body.

The electrode wire is preferably melted to the semi-conductive body in accordance with the principle shown diagrammatically in Fig. 8. In this method a gauge or jig 21 is placed over a semi-conductive body 20, this gauge being made for example of graphite. The gauge has a narrow aperture 22, into which an electrode wire (not shown) is introduced, this wire bearing on the body 20 by its own weight. The assembly is arranged on a slide or on a conveyor belt 23 and is moved through a heating device, which is shown diagrammatically by a coil 24. The assembly may be arranged in a tube in which an inert or a reducing atmosphere is maintained. Owing to the heating a small quantity of the metal having the lower melting point will flow over the adjacent surface of the semi-conductive body and produce an alloy electrode. The body is then taken out of the gauge 21 and introduced into a double gauge (Fig. 9) in which a second electrode may be arranged in the same manner. The lower portion 25 of the gauge has an aperture 26, in which the electrode wire 27 previously introduced hangs freely; the upper portion 28 of this gauge has the same shape as the gauge 21.

In many cases the electrode wire 27 will remain in this suspended position due to the adhesion of the alloy 5 (Figs. 1 to 4) to the body; if the adhesion is not sufficient, the wire may be supported carefully.

Figures 9, 10, 11:
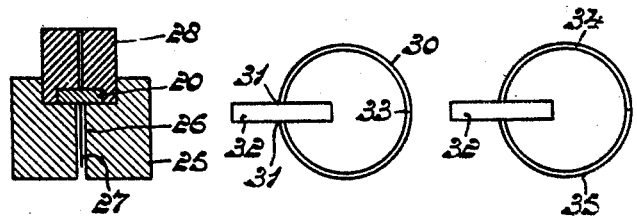
Figs. 10 and 11 show a semi-conductive body clamped in a clamping member constituted by one and two pieces of electrode wire, respectively.

The sealing operation may be carried out in a still simpler manner (shown in Figs. 10 and 11). In this case an electrode wire 30 is curved to form a clamp, the limbs 31 of which are pressed one against each side of a semi-conductive body 32. After the assembly has been subjected to the desired thermal treatment, the wire 30 may be cut at 33, after which the two ends are provided with connecting members.

The electrodes manufactured in this manner will be similar to one another. In order to manufacture different electrodes, use may be made of a wire having two portions 34 and 35 (Fig. 11). If the block 32 is made of n-type germanium and the electrode wire 34 contains indium as the metal having the lower melting point, while the corresponding component in the electrode wire 35 is made of tin, the electrode wire 34 will produce an electrode of the p-type, whereas the wire 35 will produce an ohmic contact. The assembly then constitutes a diode.

The clamp need, of course, not be made entirely of wire. As an alternative, a clamp having resilient limbs may be made in a different manner, the electrode wire being secured to the ends of the limbs.

It has been found that the part of the electrode wire having the higher melting point is not in contact with the semi-conductive body, in spite of the pressure exerted, since the molten alloy forms a thin layer between these two parts.

With respect to the metals of the electrode wire, there is an ample choice, which is to be based first on the electrical properties of the electrode system to be manufactured. The metal melting readily will have to operate, as a rule, as a donor or as an acceptor relative to the semi-conductive material. If we are concerned with an alloy, one of the constituents must perform this action.

For manufacturing a so-called pnp-type transistor on germanium, a block of n-type germanium may be used, while the readily melting metal may be indium. In order to prevent the indium from penetrating too deeply into the germanium, or in other words, to prevent it from dissolving an excessive quantity of germanium, it may be advisable to dissolve germanium previously in the indium.

For manufacturing an npn-type transistor an alloy of lead and antimony may be used.

The metal having the higher melting point must maintain its rigidity at the temperature at which the electrode is sealed. If it dissolves to an appreciable extent in the alloy of the electrode, it must not affect its electrical properties. In the aforesaid example the indium alloy may for example be housed in a nickel or aluminum tube.

What is claimed is:

1. A semi-conductor device comprising a semi-conductive body, and a heterogeneous, wire-like member comprising an unfused higher-melting-point metal member supporting in an aperture in said member a lower-melting-point conductivity-determining metal mass, said wire-like member contacting and being bonded to a portion of said semi-conductive body of one conductivity type only with substantially only said lower-melting-point metal fused to and forming in said contacted body portion a p-n junction having an area exceeding the cross-sectional area of the wire-like member yet substantially defined by the cross-sectional area of the unfused metal member.

2. A semi-conductor device comprising a semi-conductive body, and a wire-like member comprising a hollow tubular member constituted of a higher-melting-point metal containing and supporting a lower-melting-point conductivity-determining metal on its interior, said wire-like member contacting and being bonded to a portion of said semi-conductive body of one conductivity type only with substantially only said lower-melting-point metal fused to and forming in said contacted body portion a p-n junction having an area exceeding the cross-sectional area of the wire-like member yet substantially defined by the cross-sectional area of the unfused tubular member.

3. A semi-conductor device as set forth in claim 2 wherein an indentation is provided on the tubular member closing off the latter at a location in proximity to the p-n junction to control the quantity of lower-melting-point metal fused to the semi-conductive body.

4. A semi-conductor device comprising a semi-conductive body, and a wire-like member comprising a porous metal matrix constituted of a higher-melting-point metal and a lower-melting-point conductivity-determining metal in the pores of said matrix, said wire-like member contacting and being bonded to a portion of said semi-conductive body of one conductivity type only with substantially only said lower-melting-point metal fused to and forming in said contacted body portion a p-n junction having an area exceeding the cross-sectional area of the wire-like member yet substantially defined by the cross-sectional area of the unfused metal matrix.

5. A semi-conductor device comprising a semi-conductive body, and a wire-like member comprising a metal member having surface holes and constituted of a higher-melting-point metal and a lower-melting-point conductivity-determining metal in the surface holes and supported by the member, said wire-like member contacting and being bonded to a portion of said semi-conductive body of one conductivity type only with substantially only said lower-melting-point metal fused to and forming in said contacted body portion a p-n junction having an area exceeding the cross-sectional area of the wire-like member yet substantially defined by the cross-sectional area of the unfused metal member.

6. A method of making a semi-conductor device comprising providing a semi-conductive body with opposed surfaces, shaping a heterogeneous, wire-like member comprising a higher-melting-point metal member supporting a lower-melting-point conductivity-determining metal mass so that its ends contact opposed surfaces of the semi-conductive body and are there maintained in position, and heating said member and body at a temperature at which substantially only the lower-melting-point metal fuses to and forms in said body portion at least one p-n junction having an area exceeding the cross-sectional area of the wire-like member yet substantially defined by the cross-sectional area of the unfused metal member.

7. A method as set forth in claim 6, wherein the ends of the wire-like member possess different compositions.

8. A method as set forth in claim 6, wherein the ends of the wire-like member are maintained in position by the natural resilience of the wire-like member itself.

9. A semi-conductor device comprising a semi-conductive body and a wire-like member comprising a lower-melting-point impurity-bearing core material completely surrounded by and contacting a higher-melting-point sheath, said wire-like member contacting and being bonded to a portion of said semi-conductive body of one conductivity type only with substantially only said lower-melting-point impurity-bearing material fused to and forming in said contacted body portion a p-n junction having an area substantially defined by the cross-sectional area of the sheath.

References Cited in the file of this patent

UNITED STATES PATENTS

| | | |
|---|---|---|
| 2,321,071 | Ehrhardt et al. | June 8, 1943 |
| 2,402,839 | Ohl | June 25, 1946 |
| 2,640,901 | Kinman | June 2, 1953 |
| 2,654,059 | Shockley | Sept. 29, 1953 |
| 2,671,156 | Douglas et al. | Mar. 2, 1954 |
| 2,792,538 | Pfann | May 14, 1957 |